United States Patent [19]

Dooley et al.

[11] 4,227,402
[45] Oct. 14, 1980

[54] COMBUSTION MONITORING SYSTEM FOR FUEL INJECTED ENGINES

[75] Inventors: Daniel J. Dooley, Burr Ridge; Terrence L. Dooley; Joseph L. Dooley, both of Chicago, all of Ill.

[73] Assignee: Creative Tool Company, Lyons, Ill.

[21] Appl. No.: 960,600

[22] Filed: Nov. 14, 1978

[51] Int. Cl.³ .......................................... G01M 15/00
[52] U.S. Cl. ................................ 73/115; 73/119 A; 310/338
[58] Field of Search ............... 73/119 A, 753, 756, 73/115, 723; 310/338; 123/33 D

[56] References Cited

U.S. PATENT DOCUMENTS

| 2,256,307 | 9/1941 | Beale et al. | 73/115 X |
|---|---|---|---|
| 2,316,269 | 4/1943 | Maruhn | 123/33 D |
| 2,454,264 | 11/1948 | Stigter | 310/338 |
| 4,012,940 | 3/1977 | Change et al. | 73/723 X |

*Primary Examiner*—Jerry W. Myracle
*Attorney, Agent, or Firm*—Neuman, Williams, Anderson & Olson

[57] ABSTRACT

A transducer and associated diagnostic system for fuel injected diesel engines of the type having glow plugs to provide supplementary ignition during starting and warm-up periods. A piezoelectric transducer unit is adapted to screw into the receptacle normally provided in each cylinder for a glow plug. The unit includes a piezoelectric element which is held under tension by a conductive rubber plug which coacts with a coaxial connector in transmitting the pressure indicative output signal. The transducer develops an electrical signal which varies in accordance with the pressure-time characteristic of the cylinder combustion chamber, the electrical signal representing performance of each cylinder being processed individually to provide timing and other valuable information or being combined with electrical signals developed for other cylinders of the engine in a comparative diagnostic system.

18 Claims, 5 Drawing Figures

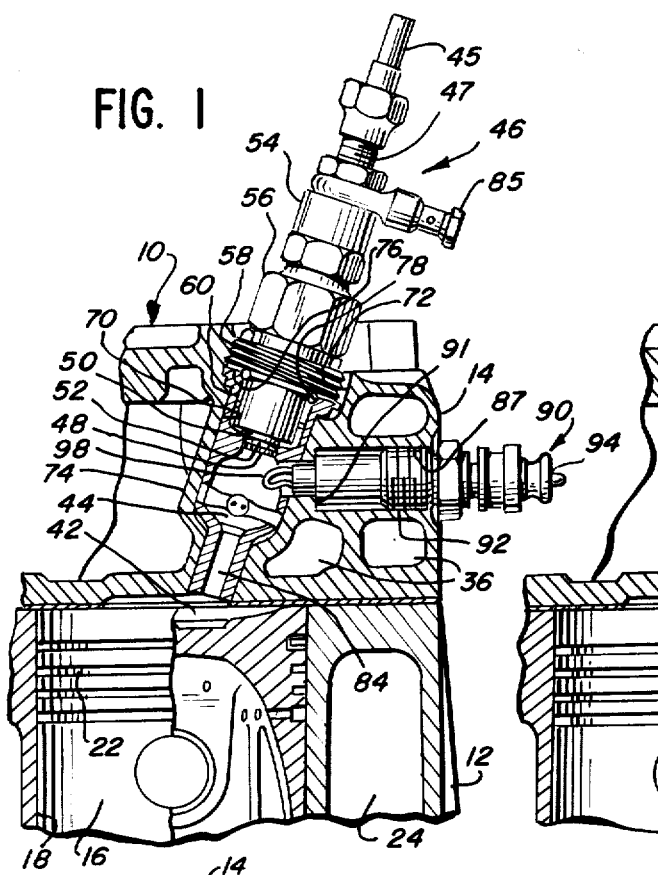
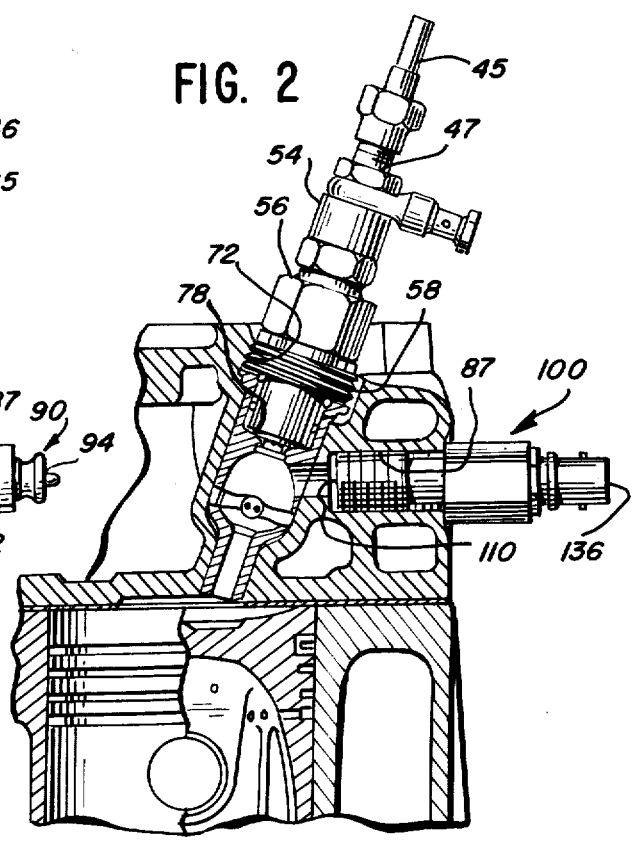
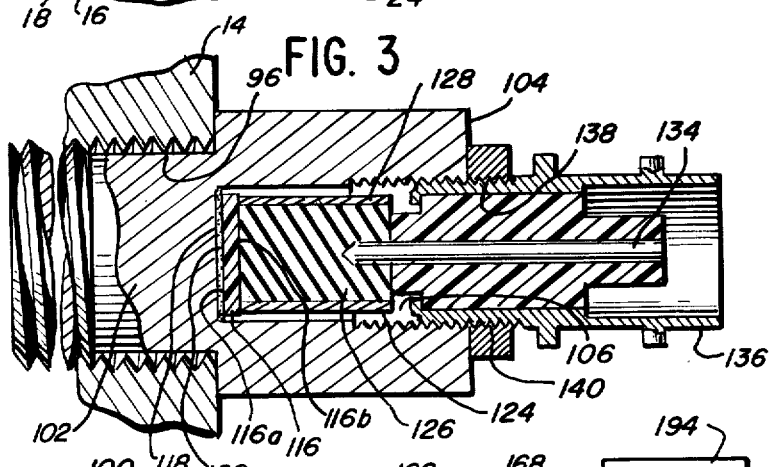
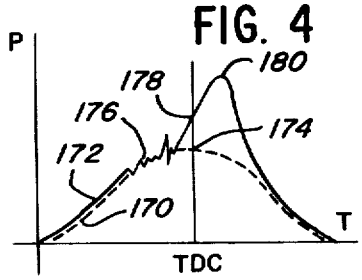
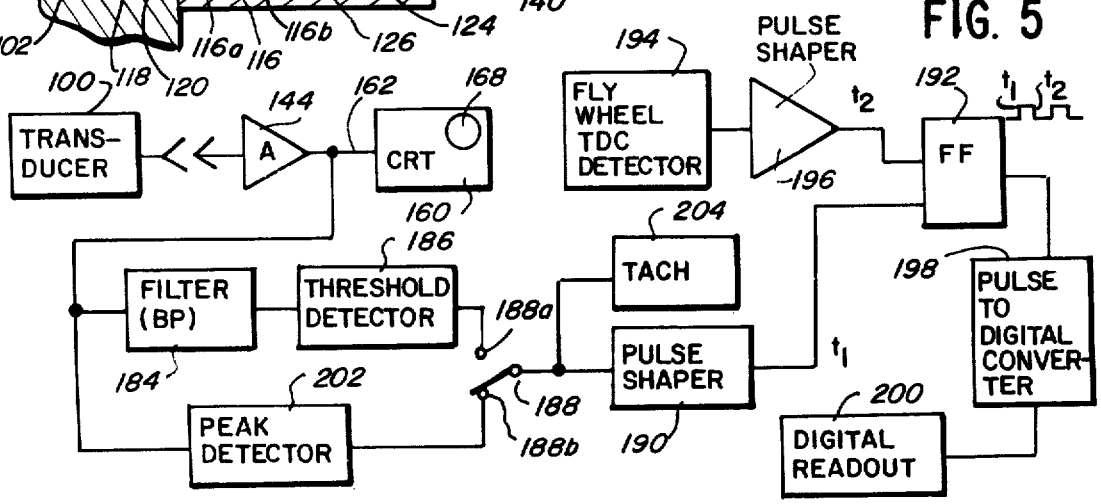

4,227,402

COMBUSTION MONITORING SYSTEM FOR FUEL INJECTED ENGINES

FIELD OF THE INVENTION

The present invention is related to diesel diagnostic systems in general and to diagnostic systems for glow plug-fired diesel engines in particular.

BACKGROUND OF THE INVENTION

Various diagnostic devices have been devised for providing useful timing and cylinder pressure information from fuel-injected diesel engines. For example, U.S. Pat. No. 4,036,050 of one of the applicants, Joseph Dooley, and Edward Yelke discloses various transducers incorporating piezoelectric material mounted so as to respond to pressures created within the holding clamps, dogs or retaining bolts of an injection nozzle assembly of a fuel-injected engine to provide electrical signals which are generally representative of the pressure variations within the cylinder. These devices are generally limited to engines using some sort of bolts, clamps, or dogs for holding the cylinder injection nozzle in constant engagement with its access port to the cylinder. Many engine types do not utilize such nozzle retaining apparatus. Other transducers have been devised for detecting cylinder pressure through special ports provided in the cylinder head for laboratory experimentation. The latter devices, of course, require special adaptation of the engine cylinder block and are totally impractical for field and general diagnostic applications outside the laboratory.

Other transducers have been devised for siphoning off a portion of the cylinder pressure through a small capillary tube provided in a specially-designed spark plug for a conventional spark plug-fired gasoline engine. Transducers of this type develop signal distortions due to pressure lag, frictional pressure loss and gas column resistance, as reported in the 1978 SAE Journal No. 0098–2571/ 78/8605–0054.

OBJECTS OF THE INVENTION

The present invention overcomes the drawbacks and deficiencies of the prior art through the provisions of a transducer assembly which is adapted to detect cylinder pressure variations through existing apertures already provided for the glow plugs or spark plugs of the engine.

More specifically, it is a general object of the present invention to provide a diagnostic system which requires no modification whatsoever to existing engine components, thereby making the diagnostic system useful for field applications as well as the laboratory.

It is another object of the present invention to provide a transducer assembly which detects pressure variations within the cylinder of a glow plug-aided fuel-injected engine in a most direct manner rather than through the nozzle assembly.

It is still a further object of the invention to provide a transducer with associated circuitry and read-out devices for detecting the occurrence of the various events of the fuel injection cycle such as nozzle opening, firing and peak pressure. It is a related object to provide for the detection of these events during the normal operation of the cylinder in the field as well as the laboratory.

It is a more specific object of the invention to provide a transducer design which is simple and inexpensive to manufacture and which involves few components and no moving parts. More generally it is an object of the invention to provide such an inexpensive transducer which is at the same time rugged and dependable.

SUMMARY OF THE INVENTION

These and other objects are accomplished through the provision of a diagnostic system which includes a transducer adapted and designed to replace the conventional glow plug within the cylinder of a diesel. The transducer is in the form of an elongated bolt-shaped structure having a shank portion extending into the cylinder to act as a pressure detecting face and an expanded head portion which seats against the engine itself and includes a cavity for housing a piezoelectric element. The element is located parallel to and in proximity with the plane at which the enlarged head seats against the engine and is held under tension by a plug of conductive rubber which, in turn, transmits the signal from the piezoelectric element to the central conductor of a BNC-type coaxial connector. To utilize the high quality pressure signal from the transducer circuitry and read out apparatus is provided including a cathode ray tube for viewing the pressure signal, a bandpass filter network and threshold detector for detecting the occurrence of nozzle opening, a peak detector for sensing the occurrence of peak firing pressure, a tachometer for displaying engine RPM and a timing circuit including a TDC sensor for displaying the timing of either nozzle opening or peak cylinder pressure with respect to the occurrence of the Top Dead Center condition of the piston within the cylinder.

For a more complete understanding of this invention reference should now be made to the embodiment illustrated in greater detail in the accompanying drawings and described below by way of an example of the invention.

BRIEF DESCRIPTION OF THE DRAWINGS

FIG. 1 is a partial cross section of a view of the cylinder head assembly of a conventional diesel engine having a glow plug inserted for ignition and warm-up.

FIG. 2 is a cross sectional view of the cylinder-head assembly of the conventional engine shown on FIG. 1 with the glow plug replaced with a transducer assembly constructed in accordance with the present invention.

FIG. 3 is an enlarged cross sectional view of the transducer assembly shown in FIG. 2.

FIG. 4 is a pressure-time curve illustrating the electrical signal developed by the transducer assembly shown in FIGS. 2 and 3.

FIG. 5 is a block diagram of an electrical circuit and read out apparatus for processing the electrical signal shown in FIG. 4 derived from the transducer of FIGS. 2 and 3.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS INCLUDING PREFERRED EMBODIMENTS

Turning first to FIG. 1, there is shown a section of a typical diesel engine 10 which consists generally of a block assembly 12 and compression head 14. The block is shown cut away to reveal a piston 16 which operates in a cylinder 18. The piston is coupled to a crankshaft (not shown) via a connecting rod and has a plurality of rings 22 which operate in a conventional manner to maintain compression and enhance lubrication within the cylinder 18. Passages 24 are provided in the block assembly 12 for coolant flow.

The compression head 14 includes an air intake system (not shown) which provides air for the combustion process through the operation of a conventional valve mechanism which opens and closes an air inlet port under the control of appropriate linkage driven by other components of the engine. The compression head 14 also houses passages 36 for water or coolant flow to control the temperatures developed within the compression head. An airtight seal to define a combustion chamber 42 which expands and contracts in volume with vertical movement of the piston 16 within the cylinder 18 is formed by coupling the head 14 to the block assembly 12 by appropriate bolts and gaskets.

Fuel is provided to the pre-combustion chamber 44 of each cylinder by a fuel injector pump (not shown) through a fuel line 45 and screw-type nozzle assembly 46. The fuel line 45 is attached to the inlet 47 of the nozzle assembly 46.

Several different injector systems are employed with diesel engines. Typically, a single injector pump with appropriate fluid gates provides fuel for each of the cylinders in a cyclical fashion. In some engines, however, each cylinder is provided with a separate pump which may be either remote from or integral with the nozzle assembly 46. It is also common to use a plurality of nozzle assemblies for injecting fuel into a given cylinder or a single nozzle assembly with a plurality of orifices for distributing fuel within the pre-combustion chamber 44. The apparatus of the present invention, as defined below, is applicable to any and all of the aforesaid configurations.

The nozzle assembly 46 carries fuel from the fuel line to an inlet port 48 of the pre-combustion chamber 44. At the fuel inlet port 48 into the pre-combustion chamber is an injector gasket 50, typically in the form of a copper or brass washer surrounding a protruding portion or orifice 52 at the tip of the nozzle assembly 46.

There is depicted in the embodiment of FIGS. 1 and 2 a screw-in type nozzle assembly 46 having a body portion 54 with a cap nut 56, a threaded ring 58 and an injection valve assembly 60. For the purpose of seating the screw-type nozzle assembly 46 in sealing engagement with the inlet port 48 of the pre-combustion chamber 44 there is provided a nozzle assembly receptacle 70 having a threaded portion 72 in the compression head 14 and adapted to enter into a screw-type engagement with the threaded ring 58 of the nozzle assembly 46 and to thereby maintain axial pressure thereon toward the engine housing. The cap nut 56 is integral with the threaded ring 58 and is a convenient means for gripping the nozzle assembly 46 as it is screwed into engagement with the threaded portion 72 of the receptacle 70. First a pre-combustion housing 74 adapted to be compression fitted into the inner part of the receptacle 70 is inserted therein. The nozzle assembly 46 is then inserted into the receptacle 70 and into the pre-combustion housing 74. The nozzle assembly 46 is then screwed into the receptacle 70 until a side 76 of the threaded ring 58 abuts and seals against the circular ridge 78 forming the inlet port 48, thereby holding the nozzle assembly 46 and pre-combustion housing 74 firmly in place in the receptacle 70. The remaining space within the pre-combustion housing 74 serves as the pre-combustion chamber 44 and a channel 84 connecting the pre-combustion chamber 44 to the combustion chamber 42.

The nozzle assembly 46 may be any of a variety of different types. Typically, injector nozzles include an internal spring-loaded valve which is hydraulically opened by the fuel provided by the pump as the pressue exerted by that fuel exceeds a predetermined minimum level. As such, the nozzle assembly isolates the fuel line from pressures created in the pre-combustion chamber 44 during most of the combustion cycle. Although not relevant to the present invention, it is noted that most injector nozzles additionally provide a metering function in that the volume of fuel for a given injection cycle is carefully controlled and excess fuel supplied by the pump is bypassed back to the fuel supply through a return line 85 shown in FIG. 1.

As shown in FIG. 1, a receptacle 87 formed in the head 14 is adapted to accept a glow plug 90. The glow plug 90 has a partially threaded shank portion 92 of gradually reduced diameters extending into the pre-combustion chamber 44 and seating against an interior ridge 91 of the plug receptacle. The plug also has an expanded head portion 94. The receptacle 87 extends from the pre-combustion chamber 44 to the outside of the compression head 14 and includes a threaded portion 96 for a screw-type engagement with the threaded part of the plug shank 92. The glow plug 90 is screwed into the receptacle 87 until the plug seats against the ridge 91 in the compression head 14. A filament 98 at the forward end of the glow plug 90 is electrically coupled by means of wiring (not shown) within the glow plug 90 and at the enlarged head portion 94 to a suitable electrical power source. The filament 98 is heated and thereby assists in igniting the fuel in colder weather when diesel engines often experience starting problems.

In normal operation of the diesel described, air supplied to the cylinder 18 through the air inlet port is compressed during upward movement of the piston 16. After closure of the air inlet port but while compression is still increasing within the cylinder 18, the injector pump supplies fuel to the fuel line. When the pressure of the fuel within the fuel line is sufficient to open the spring-loaded valve in the nozzle asembly 46, ejection of fuel into the pre-combustion chamber 44 and from there into the combustion chamber 42 begins. The combination of heat and pressure within the combustion chamber 42 ignites the fuel, resulting in a still further and more rapid increase in pressure to begin the power stroke which forces the piston 16 downward in the cylinder 18.

In accordance with the present invention, means are provided to monitor these pressure changes within the pre-combustion chamber 44 so as to provide an electrical signal which is useful in monitoring engine performance or performance within the individual cylinder. More specifically a transducer assembly 100 of appropriate sensitivity is substituted for the glow plug 90. Axial forces on the transducer assembly 100 created by pressure changes within the pre-combustion chamber 44 are thereby detected external to the engine housing to facilitate convenient and economical performance monitoring. To these ends, the embodiment depicted in FIG. 2 includes a transducer 100 shown mounted in the receptacle 87.

As shown in more detail in FIG. 3, the transducer 100 is in the form of an elongated bolt-shaped device having a threaded shank portion 102 which extends toward the pre-combustion chamber 44 and is sized to replace the glow plug 90 in the receptacle 87 and to enter into screw-type engagement with the threaded portion 96 thereof. The transducer 100 also has an expanded head portion 104 which seats against the compression head 14 itself. A cavity 106 extends along the axis of the receptacle 87 with the bottom surface 118 of the cavity being substantially parallel to and in proximity with the plane at which the enlarged head 104 seats against the compression head 14. The forward end of the shank 102 is relatively blunt and extends into the receptacle 87 to act as a pressure detecting face 110 (see FIG. 2). A disc 116 of piezoelectric material is connected to the bottom surface 118 of the cavity 106 by a conductive adhesive layer 120. The disc 116 is at or near a point of flexing which, in this instance, is adjacent the point where the head portion 104 seats against the compression head 14.

The positioning and bonding of the piezoelectric disc 116 within its receptacle is similar to that disclosed for the cap screw embodiment of the aforesaid U.S. Pat. No. 4,036,050. The disc 116 is typically a ceramic crystal structure possessing piezoelectric properties, i.e., the ability to produce a voltage when subjected to a mechanical stress acting in a specific orientation with respect to the crystallographic axis of the material. Materials such as Mallory P.C. 5 or Clevite P.Z.T. 5 have proven suitable for this purpose. Typical materials of this type have two parallel major surfaces between which the stress-responsive voltage is developed. In the embodiment shown in FIGS. 2 and 3, the forward surface 116a of the disc 116 is bonded by a conductive adhesive 120 to the bottom 118 of the cavity 106, while its rear surface 116b is electrically coupled to monitoring apparatus to be described below. The adhesive 120 bonding the disc 116 to the surface 118 is preferably of a type which maintains electrical contact between the disc 116 and the surface 118 through the wide variations of temperature encountered during normal operation of the engine. Mounted on the surface 118 as described, the disc 116 is flexed or bent as a result of axial pressures acting along the body of the shank 102 during pressure changes within the combustion chamber 42. At the same time, pressures exerted radially from within the shank 102 have little or no effect on the disc 116. Likewise, vibration from the engine itself has been found to have little or no effect on the signal developed by the transducer. In other words, the output voltage developed in the disc 116 as shown in FIG. 5, is closely representative of actual cylinder pressure. A detailed discussion of this signal is presented below.

It has been found that the quality of the transducer output signal is greatly enhanced by the fact that the piezoelectric element 116 is held in compression in a position substantially parallel to and in proximity with the plane at which the enlarged head 104 seats against the compression head 14. In accordance with another aspect of the present invention the piezoelectric element 116 is held in compression by one end of a plug 124 of conductive material which engages the disc 116 at the primary point of stress and flexure of the transducer 100 due to changes in pressure of the pre-combustion chamber 44 and combustion chamber 42. To insure that the primary stress and flexure of the transducer head occurs where the enlarged head 104 seats against the compression head 14, the transducer 100 is shorter in shank length than the replaced glow plug. Unable to seat against the internal end of the glow plug receptacle, the entire inward force exerted by the plug on the compression head occurs at the interface between the enlarged head portion 104 and the engine. Increased pressure from within the cylinder relaxes the pressure at this interface to flex the piezoelectric element 116 and create an output signal. To insure that the plug 124 is insulated from contact with the walls of the transducer head the plug 124 has a conductive core 126 surrounded by an insulator 128. The core 126 is preferably formed of a conductive rubber such as SC-Consil, an electrically semi-conductive silicone elastomer manufactured by Tecknit of Cranford, New Jersey. The insulator 128 is preferably a thin-walled heat shrinkable insulating tubing, e.g., Type L-79F of Amp Special Industries of Valley Forge, Pennsylvania. At the other end of the plug 124 the conductive core 126 is pierced by the central conductor 134 of a BNC-type coaxial connector 136. The rear portion 138 of the walls of the cavity 106 is threaded for screw-type engagement with a threaded portion 140 of the connector 136. The output voltage developed at the piezoelectric element 116 is transmitted through the conductive core 126 to the central conductor 134 of the BNC-type connector 136 and from there to suitable monitoring apparatus.

Alternatively, the connector 136 can be replaced by a nylon or other insulating bolt having a centrally disposed metal screw which extends axially into engagement with the conductive rubber plug core 126 to extract the electrical signal from the surface 116b of the disc 116. A suitable connector attached to the head of the screw can then take the signal from the screw for connection to the monitoring apparatus.

For the purpose of utilizing the transducer output signal to provide a visual indication of engine performance, various output devices including a CRT display, tachometer and timing circuits, as shown in FIG. 5 are provided. Turning first to the CRT display, the transducer provides an output pulse during each power cycle of the engine.

Because a piezoelectric transducer is sensitive to loading, an isolation amplifier 144 having a high-impedance input is provided to receive the signal from the transducer 100. For diagnosing problems arising within the cylinder 18, the pressure-time characteristic during the power cycle of the individual cylinder 18 is of interest. The transducer apparatus of the present invention is of particular value for these more demanding monitoring applications. To this end the circuit of FIG. 5 is shown with an output indicator in the form of a CRT display 160 having an input 162 coupled to receive the output of the isolation amplifier 144 for display on a conventional CRT screen 168. The display may be a standard oscilloscope or any other display having a capability to synchronize automatically to the time base of the input signal. Alternately the display may have its horizontal sweep triggered from or synchronized to an externally developed signal such as may be derived from the flywheel pick-up disclosed below or from various timing pulses existing within the transducer output signal itself. The signal appearing on the screen 168 during monitoring of a properly operating cylinder 18 is shown in the pressure-time trace of FIG. 4, wherein the voltage developed from the transducer 100 is the ordinate and time is the abscissa. A grid impressed on the screen 168 provides proper calibration. The amplitude of the signal at any given point above the zero axis represents instantaneous pressure within the cylinder 18. This amplitude can be compared against known standards to ascertain the performance of rings and valves in maintaining compression.

The pressure-time curves shown in FIG. 4 represent performance of the same cylinder under two separate conditions. The broken line or curve 170 represents the signal monitored on the screen 168 during operation of the cylinder 18 with the fuel source to the cylinder 18 interrupted, while the solid line or curve 172 represents the signal monitored on the screen 168 with the fuel injection system for the cylinder 18 operative. From the broken-line trace 170 it is seen that during interruption of the fuel source to the cylinder 18 the transducer 100 develops a signal, viewable on the screen 168, which represents the pressure change within the pre-combustion chamber 44 or combustion chamber 42 (FIG. 2) resulting only from the contraction and expansion of the volume of the chamber 42 during one cycle of the piston 16. The point at which the piston 16 achieves the position of top dead center (TDC) can be seen to occur when the pressure is at its highest point, as indicated at 174 in FIG. 4. For timing purposes the point TDC has substantial significance.

When the fuel injection system is operative, a substantially different signal is developed by the transducer 100 and viewable on the 168. The trace or curve 172 rises similar to the curve 170 during upward travel of the piston 16 and before fuel injection. A high frequency oscillation, typically at 2000 to 3000 Hz., indicated at 176, occurs as a result of spring chatter in the injection nozzle 46 during the fuel injection period. Absence of this chatter is an indication of a faulty nozzle. Observance of a change in these oscillations or a shift in time of these oscillations with respect to the time of TDC is also indicative of a faulty nozzle. As fuel is injected into the cylinder 18, the amplitude of the pressure-time curve increases rapidly, as shown at 178, until peak firing pressure occurs at point 180. If an injector nozzle 46 is leaking or opening at insufficient pressue or has a clogged orifice, the amplitude of the transducer signal is reduced substantially from the norm to indicate a pressure only slightly higher than the cylinder pressure without injection.

While the aforesaid amplitude variations are of significant interest in and of themselves, the relationship between these variations on the time scale is of additional and potentially greater significance. For a given engine operating at a given speed, the time (commonly called "port closure") at which the injection pump (not shown) begins to deliver to the fuel line (not shown) bears a fixed relationship to the time at which the piston 16 attains its top dead center (TDC) position.

Still further information can be obtained by providing each of the cylinders of an engine with a separate transducer and by viewing the output signals from each cylinder on separate traces of a single scope using a common time base synchronized to the signal from any one of the cylinders. Relative timing and amplitude information for each signal may be viewed on the CRT screen to give a valuable indication of trouble spots or excessive wear in one or more cylinders which might result in deteriorating performance from the engine as a whole.

The transducer of the present invention has been found to develop a far cleaner, less noisy and hence more accurate electrical representation of the pressure variations within the cylinder head than had been available with previous transducers known to the inventors.

To utilize the unusually high quality of the pressure signal developed herein, circuit means have been provided for extracting and utilizing the important timing information available from the signal and in particular the indications of nozzle opening "chatter" and peak firing pressure that exist on the transducer output signal. To this end, the circuitry shown in FIG. 5 includes circuits for processing the signal derived from the transducer in alternate paths. The first path of processing includes a filter 184 of the bandpass variety which is adopted to separate the audio frequency oscillations (2000 to 3000 hertz) that result from the nozzle "chatter" during opening. In this mode of operation, termed the "nozzle opening advance mode," or OA mode, the output of the filter 184 is fed through a threshold detector 186 which produces an output pulse only if the level of activity in the desired frequency range detected by the bandpass filter 184 is above a predetermined minimum. The output pulse from the threshold detector 186, therefore, rises at the beginning of the opening of the injector nozzle and falls at the completion of the opening of the injector nozzle. Once the nozzle is fully opened, the "chatter" subsides. In this OA mode this nozzle opening signal is selectively gated through contact 188a of a single-pole double-throw switch 188 to a pulse shaper 190 and thence to one input of a flip-flop 192. The other input to the flip-flop 192 is provided by a pulse derived from a flywheel attachment 194 for detecting the top dead center position on the flywheel. Typically, the flywheel top dead center position is indicated by an irregularity such as a mark or a raised portion on the flywheel which is detectable by an inductive or optical detector mounted to the flywheel housing. The signal from the flywheel TDC detector 194 is shaped in an amplifying pulse shaper circuit 196 prior to its transmission to the flip-flop or bistable circuit 192. The output from the bistable circuit 192 is in the shape of a pulse having a width which is proportional to the time delay between nozzle opening and the achievement of the top dead center position by the flywheel of the engine. This pulse is fed to a pulsewidth-to-digital converter 198 which in turn drives a digital readout 200 to provide the operator with an indication of nozzle opening advance. What has been described thus far is the injection advance mode of operation.

The pulsewidth-to-digital converter circuit may be a simple integrator plus an analog-to-digital converter. Another pulsewidth-to-digital converter circuit gates high frequency clock pulses to a binary counter during the duration of the output pulse from the bistable circuit 192. Thereafter the digital readout 200 provides a decimal number on a suitable visual display to the operator. The output may be calculated in degrees of crankshaft rotation or in milliseconds, depending on the application.

An alternate mode of operation, the "peak delay" or PD mode, is also available from the circuitry of FIG. 5. For this purpose a suitable peak detector circuit 202 is provided for producing an output pulse upon occurrence of the maximum amplitude of the signal derived from the transducer and hence the peak firing pressure within the cylinder. The output from the peak detector 202 is fed to the alternate active contact 188b of the manual switch 188, from which it is selectively coupled to the pulse shaper 190 and processed in the manner previously described for the "opening advance" or OA mode of operation. However, since the peak firing pressure normally occurs after the engine has achieved the top dead center position, the flip-flop or bistable circuit 192 will normally be toggled first by the signal derived from the flywheel TDC detector 194 and thereafter reset to its original state at the time $t_1$ by the output from the pulse shaper 190. Suitable provision is made in the pulse to digital converter 198 and digital readout 200 to indicate to the operator whether the signal he is reading is an advance or delay signal.

The tachometer 204 provides an accurate output indication of engine speed so long as a single pulse is received by it during each revolution of the crankshaft. Accordingly, the tachometer will provide an accurate indication of engine speed whether it is driven by the output from the bandpass filter 184 or from the peak detector 202. In any event, the provision of a tachometer indication simultaneous with an indication of either the nozzle opening advance or peak firing delay gives a valuable indication of engine performance.

As still a further combination of components within the scope of the present invention, the transducer may be combined with and provide a signal to the timing circuitry shown in the copending application of Edward Yelke Ser. No. 913,826 filed June 8, 1978 now U.S. Pat. 4,185,494. The disclosure of the timing circuit in that application is incorporated herein by reference. In this latter combination, the transducer is utilized to effect the selectively delayed strobe of the timing light in a manner more fully described in the aforesaid Yelke application.

From the foregoing, it is seen that there has been brought to the art in the present invention monitoring apparatus which is at the same time inexpensive and highly effective in detecting pressure changes internal to a fuel-injected cylinder. In addition, the method and apparatus disclosed herein is applicable or adaptable to a wide variety of engines and requires no modification of existing engine components.

While the invention has been described in connection with certain preferred embodiments, it will be understood that it is not intended that the invention be limited to those embodiments. On the contrary, we intend to cover all alternatives, modifications and equivalents as may be included within the spirit and scope of the invention as defined by the appended claims.

What is claimed is:

1. For use in a diagnostic system for a diesel engine of the type having a combustion chamber associated with each cylinder and a threaded port extending from each combustion chamber to the outer surface of the engine which is adapted to accept a glow plug, a transducer assembly comprising a metal housing having a shank portion threaded for a screw-type engagement with said threaded port and a head portion external to said shank portion and having a recessed cavity extending along the axis of said port, said shank portion having a forward end for extending into said port and acting as a pressure face within the cylinder and closing the inside surface of said cavity transverse to the axis of the port, said metal housing at least partially seating against said engine at said head portion and a piezoelectric element coupled to the inner end of the cavity in substantially the same plane in which said head portion is seated against said engine so as to develop an electrical signal during flexure of said housing resulting from pressure against said pressure face, and an electrical output means coupled to the outer end of said piezoelectric element for transmitting the electrical signal from said element.

2. A method for using the transducer of claim 1 with a diesel engine having a glow plug in one threaded port comprising:
removing the glow plug from the threaded port;
inserting and engaging in the vacated threaded port the shank portion of the transducer assembly and seating the head portion against the engine; and
electrically coupling instrumentation to the electrical output means to receive and monitor the electrical signal from the piezoelectric element.

3. For use in a diagnostic system for a diesel engine of the type having threaded receptacles extending outward from each cylinder for normally receiving a glow plug which aids ignition, a transducer assembly adapted to substitute for a glow plug and to seat in said glow plug receptacle in a plane transverse to the axis of the receptacle, said transducer assembly having a blunt forward end which is cylindrical in shape and threaded to conform to the complementary threads of said glow plug receptacle, said transducer assembly further having a rearward end coupled to an electrical output and a cavity formed in from the rearward end of said transducer and a piezoelectric element fixed in a plane transverse to the axis of said glow plug receptacle and affixed to the forward end of said cavity, said piezoelectric element being a circular disc of crystalline material, the forward side of said disc being bonded by an electrically conductive adhesive to the forward face of said cavity and the rearward side of said disc being electrically coupled to the electrical output such that an electrical potential is developed between the transducer and the output in response to mechanical stress transmitted to the forward end of said transducer from within the cylinder.

4. For use in a diagnostic system for a diesel engine of the type having threaded receptacles extending outward from each cylinder for normally receiving a glow plug which aids ignition, a transducer assembly adapted to substitute for a glow plug and to seat in any one of said glow plug receptacles in a plane transverse to the axis of the receiving receptacle, said transducer assembly having a blunt forward end which is cylindrical in shape and threaded to conform to the complementary threads of said glow plug receptacles, said transducer assembly further having a rearward end coupled to an electrical output end and a cavity formed in from the rearward end of said transducer and a piezoelectric element fixed in a plane transverse to the axis of the receiving glow plug receptacle and affixed to the forward end of said cavity in substantially the same plane in which said assembly is seated in said receiving glow plug receptacle for developing an electrical output signal in response to pressures acting on the forward end of said transducer assembly from within the cylinder.

5. The transducer assembly of claim 4 wherein said piezoelectric element is substantially perpendicular to the axis of said glow plug receptacle.

6. A method for detecting force waves in solid metal objects comprising the steps of:

(a) forming a cylindrical cavity in the metal such that the axis of the cavity is substantially perpendicular to the movement of the force wave to be detected;

(b) placing at the inner end of said cavity a flat piece of piezoelectric material having a first face in electrical contact with the inner end of said cavity and the second and opposite face facing outward from said cavity;

(c) inserting into said cavity from its outer end an element comprising an inner core of an elastic, conductive material within an outer sleeve of insulating material which surrounds said conductive material except for the forward and rearward ends thereof, the forward end of said conductive material being uninsulated and adapted to be pressed against the outward facing portion of said piezoelectric element; and (d) positioning in said cavity a coaxial fitting of the type having a protruding central conductor shaft supported in spaced insulated relation to an outer cylindrical conductor, the central shaft of said coaxial fitting being adapted to conductively engage the rearward end of the conductive core upon positioning of said coaxial end fitting into said cavity, whereby said conductive core is compressed between the outward face of said piezoelectric element and said central conductor shaft of the coaxial fitting so as to provide an output terminal for the signal which develops in the piezoelectric material in response to the force waves.

7. The method of claim 6 wherein said element is cylindrical.

8. The method of claim 6 wherein said conductive core is rubber.

9. The method of claim 6 wherein threads are formed about the walls of said cavity and the coaxial fitting is threaded into said cavity.

10. A transducer for developing electrical signals in response to pressure in a chamber in a housing having a port from the outside of the housing to the chamber, comprising a body in engagement with the housing at the port having
- a first surface thereon serving as a pressure-sensing face extending into the port;
- a second surface thereon for at least partially seating against the housing at the port therein;
- a cavity in said body extending from outside the chamber toward said pressure-sensing face and having an inner surface which is in proximity with said seating surface and is transverse to said port;
- a piezoelectric element on the inner surface of said cavity for developing an electrical signal responsive to flexing of said housing due to pressure changes in the chamber;
- a compressible plug disposed in said cavity and having a core of conductive elastomeric material and an outer sheath of insulating material, said sheath being open on opposing ends so that on one end the conductive material is adapted to contact the piezoelectric element;
- means for compressing said plug within said cavity so that the conductive core contacts with said piezoelectric element; and
- output terminal means coupled to the conductive core at the opposing end of said plug for receiving the electrical signal from said piezoelectric element.

11. The transducer of claim 10 wherein said plug is cylindrical.

12. The transducer of claim 10 wherein said elastomeric material is rubber.

13. The transducer of claim 10 wherein said sheath is heat shrinkable.

14. The transducer of claim 10 wherein said terminal means is a BNC bayonet connector.

15. A method for detecting force waves in solid metal objects comprising the following steps:

(a) forming a cylindrical cavity in the metal such that the axis of the cavity is substantially perpendicular to the movement of the force wave to be detected;

(b) placing at the inner end of said cavity a flat piece of piezoelectric material having a first face in electrical contact with the inner end of said cavity and the second and opposite face facing outward from said cavity;

(c) inserting into said cavity from its outer end an element comprising an inner core of elastic, conductive material within an outer sleeve of insulating material which surrounds said conductive material except for the forward and rearward ends thereof, the forward end of said conductive material being uninsulated and adapted to be pressed against the outward facing portion of said piezoelectric element;

(d) compressing said element against said piezoelectric material to stress said material; and (e) contacting the rearward end of the conductive core to provide an output terminal for the signal which develops in the peizoelectric material in response to the force waves.

16. For use in a diagnostic system for a diesel engine of the type having a combustion chamber associated with each cylinder and a threaded port extending from each combustion chamber to the outer surface of the engine which is adapted to accept a glow plug, a transducer assembly comprising a metal housing having a shank portion threaded for a screw-type engagement with said threaded port and a head portion external to said shank portion and having a recessed cavity extending along the axis of said port, said shank portion having a forward end for extending into said port and acting as a pressure face within the cylinder and closing the inside surface of said cavity transverse to the axis of the port, said metal housing at least partially seating against said engine at said head portion and a piezoelectric element coupled to the inner end of the cavity so as to develop an electrical signal during flexure of said housing resulting from pressure changes against said pressure face, an element comprising an inner core of an elastic, electrically conductive material within an outer sleeve of insulating material which surrounds said conductive material except for the ends thereof, said element being inserted into said cavity and having one end in contact with said piezoelectric element, and an electrical output means coupled to the other end of said element for compressing said element against said piezoelectric element and for transmitting the electrical signal generated by said piezoelectric element.

17. For use in a diagnostic system for an internal combustion engine of the type having a combustion chamber associated with each cylinder and a threaded port extending from each combustion chamber to the outer surface of the engine which is adapted to accept a spark plug, a transducer assembly comprising a metal housing having a shank portion threaded for a screw-type engagement with said threaded port and a head portion external to said shank portion and having a recessed cavity extending along the axis of said port, said shank portion having a forward end for extending into said port and acting as a pressure face within the cylinder and closing the inside surface of said cavity transverse to the axis of the port, said metal housing at least partially seating against said engine at said head portion and a piezoelectric element coupled to the inner end of the cavity in substantially the same plane in which said head portion is seated against said engine so as to develop an electrical signal during flexure of said housing resulting from pressure against said pressure face, and electrical output means coupled to the outer end of said piezoelectric element for transmitting the electrical signal from said element.

18. For use in a diagnostic system for an internal combustion engine of the type having threaded receptacles extending outward from each cylinder for normally receiving a spark plug, a transducer assembly adapted to substitute for a spark plug and to seat in said spark plug receptacle in a plane transverse to the axis of the receptacle, said transducer assembly having a blunt forward end which is cylindrical in shape and threaded to conform to the complementary threads of said spark plug receptacle, said transducer assembly further having a rearward end coupled to an electrical output end and a cavity formed in from the rearward end of said transducer and a piezoelectric element fixed in a plane transverse to the axis of said spark plug receptacle and affixed to the forward end of said cavity in substantially the same plane in which said assembly is seated in said spark plug receptacle for developing an electrical output signal in response to pressures acting on the forward end of said transducer assembly from within the cylinder.

* * * * *